F. M. LEMARR.
PLOW.
APPLICATION FILED APR. 6, 1911.
1,013,667.
Patented Jan. 2, 1912.
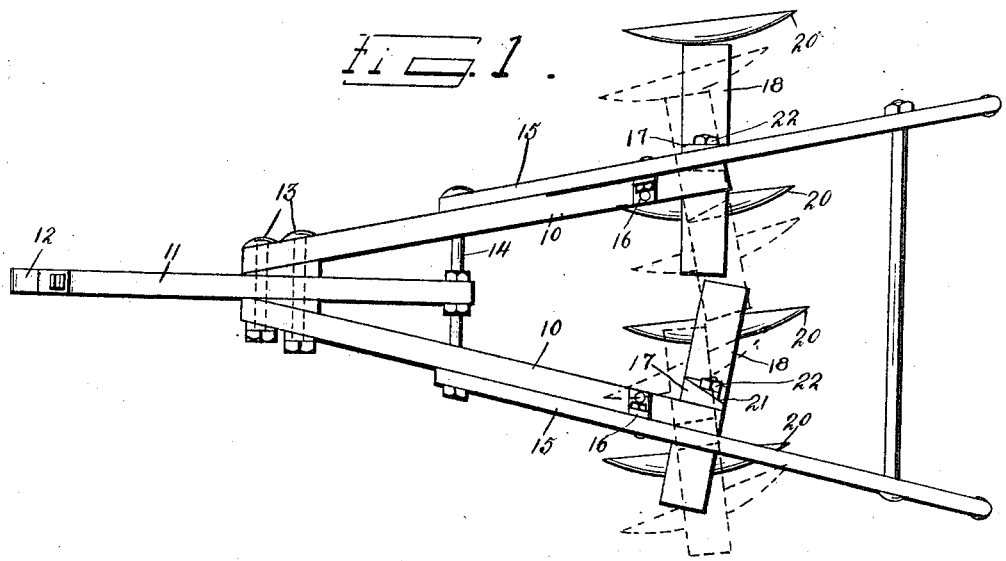
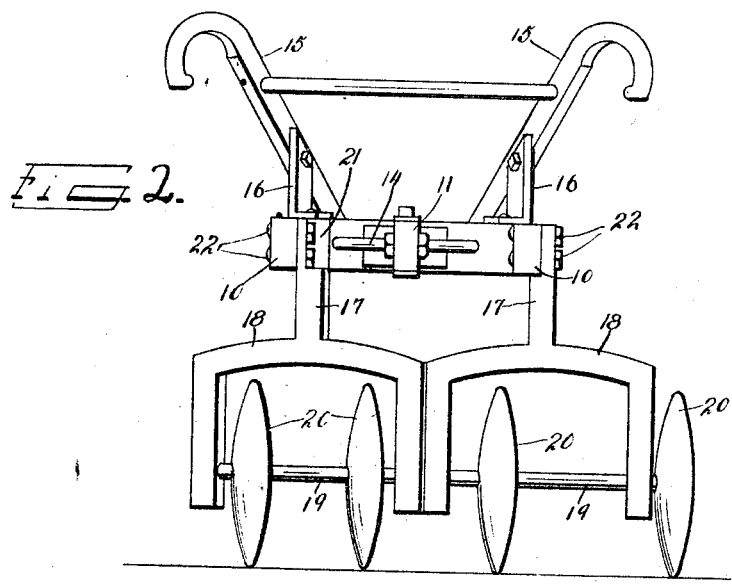
Witnesses
Inventor
Francis M. Lemarr.
By *Chandler & Chandler*
Attorneys

UNITED STATES PATENT OFFICE.

FRANCIS M. LEMARR, OF SPEEDWELL, TENNESSEE.

PLOW.

1,013,667.

Specification of Letters Patent.   Patented Jan. 2, 1912.

Application filed April 6, 1911.   Serial No. 619,395.

*To all whom it may concern:*

Be it known that I, FRANCIS M. LEMARR, a citizen of the United States, residing at Speedwell, in the county of Claiborne, State of Tennessee, have invented certain new and useful Improvements in Plows; and I do hereby declare the following to be a full, clear, and exact description of the invention, such as will enable others skilled in the art to which it appertains to make and use the same.

This invention relates to plows of the gang type and has for an object to provide a plow in which the gangs may be shifted so as to vary the magnitude of the furrow cut, this shifting movement being effected by simply shifting the gang hangers from one side of the gang beams to the other.

With the above objects in view the invention consists of the novel details of construction and combination of parts hereinafter fully described, it being understood that various modifications may be made in the minor details of construction within the scope of the appended claim.

In the accompanying drawing forming part of this specification, Figure 1 is a plan view of the plow with the gangs shown in dotted lines in position for cutting a wider furrow than ordinary. Fig. 2 is a rear elevation of the plow.

Referring now to the drawing in which like characters of reference designate similar parts in the views shown, 10 designates a pair of convergent plow beams formed of wood or other suitable material and having interposed between their juxtaposed forward ends a draft tongue 11 which is equipped with an ordinary draft attaching iron 12. The draft tongue is provided adjacent to its central portion with spaced openings through which bolts 13 are passed to rigidly secure the parts together. An elongated bolt 14 is passed through registering openings formed at the rear end of the draft tongue and in the intermediate portions of the beams, the ends of this bolt extending considerably beyond the outer faces of the beams and securing to the beams the lower ends of upwardly inclined handles 15. A pair of angle iron braces 16 are fixed to the inner faces of the handles and top faces of the beams and rigidly secure the parts together.

Each gang consists of a hanger comprising a stem 17 terminally equipped with a yoke 18 the branches of which are provided with suitable alined openings which receive the opposite ends of a shaft 19, the same having secured thereto ordinary disks 20. The stem of the hanger is rectangular in contour and is cut away obliquely on one face as shown at 21, suitable openings being formed in this oblique face and through the rear end of the related beam to receive securing bolts 22 by means of which the stem is rigidly fixed to the beam.

By now referring to Fig. 1 it will be seen that the stem of one gang hanger is arranged to bear with its inclined face against the outer face of one of the beams while the stem of the mating gang hanger is arranged with its unmutilated face against the inner face of the other beam and in this relation of the parts, the disks are in parallelism and cut a furrow of ordinary width, throwing the soil to the right as is obvious. When it is desired to cut a furrow of greater width than ordinary, the stems of both gang hangers are detached from their related beams, and shifted bodily from the positions initially occupied upon the beams to the opposite faces of the beams. The adjusted position assumed by the gangs is shown in dotted lines and it will be noted that in this position of the parts, the disks are still arranged in parallelism but incline more obliquely to the longitudinal axis of the plow than before so that a wider cut than normal is made. It will be noted that the adjustment of each gang is effected by simply removing a single pair of bolts and shifting the stem of the gang hanger to the opposite side of the related plow beam to that which the stem originally engages.

What is claimed, is:—

In a cultivator, a pair of convergent beams having a draft means secured to their juxtaposed forward ends, each of said beams having oppositely disposed flat faces at its rear end, a disk carrying member assembled with each beam and comprising a stem having oppositely disposed flat faces relatively inclined to each other, a plurality of disks carried by said member, both of said relatively inclined flat faces being independently engageable with the flat faces of the rear end of the related beam whereby the disk carrying member may be angled in order to vary the width of the furrow cut by said disks.

In testimony whereof, I affix my signature, in presence of two witnesses.

FRANCIS M. LEMARR.

Witnesses:
R. A. DYER,
D. O. DYER.